US008103599B2

(12) United States Patent
Gao et al.

(10) Patent No.: US 8,103,599 B2
(45) Date of Patent: Jan. 24, 2012

(54) CALCULATING WEB PAGE IMPORTANCE BASED ON WEB BEHAVIOR MODEL

(75) Inventors: Bin Gao, Beijing (CN); Tie-Yan Liu, Beijing (CN); Hang Li, Beijing (CN); Yuting Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 12/237,392

(22) Filed: Sep. 25, 2008

(65) Prior Publication Data

US 2010/0076910 A1 Mar. 25, 2010

(51) Int. Cl.
*G06F 17/00* (2006.01)
*G06F 17/20* (2006.01)

(52) U.S. Cl. ........................................................ 706/11

(58) Field of Classification Search ........................ None
See application file for complete search history.

(56) References Cited

U.S. PATENT DOCUMENTS

| | | | | |
|---|---|---|---|---|
| 7,194,466 | B2 | 3/2007 | Chen et al. | |
| 7,260,573 | B1 | 8/2007 | Jeh et al. | |
| 2003/0028662 | A1* | 2/2003 | Rowley et al. | 709/231 |
| 2005/0071465 | A1 | 3/2005 | Zeng et al. | |
| 2005/0108330 | A1* | 5/2005 | Sakaguchi et al. | 709/205 |
| 2006/0041553 | A1 | 2/2006 | Paczkowski et al. | |
| 2006/0095430 | A1 | 5/2006 | Zeng et al. | |
| 2007/0100824 | A1 | 5/2007 | Richardson et al. | |
| 2008/0010252 | A1 | 1/2008 | Zamir et al. | |
| 2008/0027936 | A1 | 1/2008 | Liu et al. | |
| 2008/0059446 | A1 | 3/2008 | Blass et al. | |

OTHER PUBLICATIONS

'A framework to compute page importance based on user behaviors': Liu, 2010, Springer, Inf Retrieval (2010) 13:22-45.*
'Analyzing customer behavior model graph (CBMG) using Markov Chains': Mark, 2007, IEEE, 1-4244-1148, pp. 71-76.*
'Modeling and analysis of computer system availability': Goyal, 1987, IBM J. Res. Develop. vol. 31 No. 6, pp. 651-664.*
'Optimal control of stochastic hybrid systems based on locally consistent Markov decision processes': Koutsoukos, 2005, IEEE, 0-7803-8936, pp. 435-440.*
Liu, et al., "BrowseRank: Letting Web Users Vote for Page Importance", SIGIR'08, Jul. 20-24, 2008, Singapore, 8 pages.
Luxenburger, et al., "Exploiting Community Behavior for Enhanced Link Analysis and Web Search", in Proceedings of WebDB-06, 2006, pp. 8-13.
Agichtein, et al., "Improving Web Search Ranking by Incorporating User Behavior Information", SIGIR'06, Aug. 6-11, 2006, Seattle, Washington, USA., 8 pages.
Peng, et al., "Ranking Web Search Results from Personalized Perspective", Proceedings of the 8th IEEE International Conference on E-Commerce Technology and the 3rd IEEE International Conference on Enterprise Computing, E-Commerce, and E-Services (CEC/EEE'06), 2006, 8 pages.
Amento, et al., "Does "Authority" Mean Quality? Predicting Expert Quality Ratings of Web Documents", SIGIR 2000, Athens, Greece, 2000, pp. 296-303.
Bianchini, et al., "Inside PageRank", ACM Transactions on Internet Technology, vol. 5, No. 1, Feb. 2005, pp. 92-128.
Boldi, et al., "PageRank as a Function of the Damping Factor", WWW 2005, May 10-14, 2005, Chiba, Japan, pp. 557-566.

(Continued)

*Primary Examiner* — Omar Fernandez Rivas
*Assistant Examiner* — Peter Coughlan

(57) ABSTRACT

Method for determining a webpage importance, including receiving web browsing behavior data of one or more users; creating a model of the web browsing behavior data; calculating a stationary probability distribution of the model; and correlating the stationary probability distribution to the webpage importance.

20 Claims, 4 Drawing Sheets

OTHER PUBLICATIONS

Brin, et al., "The Anatomy of a Large-Scale Hypertextual Web Search Engine", Computer Networks and ISDN Systems, 1998, 18 pages.
Feng, et al., "AggregateRank: Bringing Order to Web Sites", SIGIR'06, Aug. 6-11, 2006, Seattle, Washington, USA., pp. 75-82.
Gyongyi, et al., "Web Spam Taxonomy", In First International Workshop on Adversarial Information Retrieval on the Web, 2005, 9 pages.
Gyongyi, et al., "Combating Web Spam with TrustRank", Proceedings of the 30th VLDB Conference, Toronto, Canada, 2004, pp. 576-587.
Taher H. Haveliwala, "Efficient Computation of PageRank", Oct. 18, 1999, 15 pages.
Taher H. Haveliwala, "Topic-Sensitive PageRank", WWW 2002, May 7-11, 2002, Honolulu, Hawaii, USA., 15 pages.
Haveliwala, et al., "The Second Eigenvalue of the Google Matrix", Stanford University Technical Report, 2003, 8 pages.
Haveliwala, et al., "An Analytical Comparison of Approaches to Personalizing PageRank", Jun. 20, 2003, 4 pages.
Jarvelin, et al., "IR evaluation methods for retrieving highly relevant documents", Proceedings of the 23rd Annual International ACM SIGIR Conference on Research and Development in Information Retrieval. New York, 2000, pp. 41-48.
Jarvelin, et al., "Cumulated Gain-Based Evaluation of IR Techniques", ACM Transactions on Information Systems, 2002, 29 pages.
Jon M. Kleinberg, "Authoritative Sources in a Hyperlinked Environment", Proc. 9th ACM-SIAM Symposium on Discrete Algorithms, 1998, 34 pages.
Langville, et al., "Deeper Inside PageRank", Internet Mathematics, vol. 1, No. 3, 2004, 33 pages.
Frank McSherry, "A Uniform Approach to Accelerated PageRank Computation", WWW 2005, May 10-14, 2005, Chiba, Japan, pp. 575-582.
Page, et al., "The PageRank Citation Ranking: Bringing Order to the Web", Jan. 29, 1998, 17 pages.
Richardson, et al., "The Intelligent Surfer: Probabilistic Combination of Link and Content Information in PageRank", In Advances in Neural Information Processing Systems, 2002, 8 pages.
White, et al., "Studying the Use of Popular Destinations to Enhance Web Search Interaction", SIGIR 2007 Proceedings, 2007, pp. 159-166.

* cited by examiner

CALCULATING WEB PAGE IMPORTANCE BASED ON WEB BEHAVIOR MODEL

BACKGROUND

Search services currently use conventional link analysis algorithms to compute the importance of a particular web page. Input data for link analysis algorithms may be obtained from link graphs which represent the web pages and the hyperlinks that link to those particular web pages. The link analysis algorithms employ a discrete-time Markov process to model the behavior of a web user using the web pages and links listed in a link graph. Unfortunately, link graphs may not accurately represent the importance of each webpage because links can be easily added and deleted by webmasters. Some webmasters even create web pages with link spam, different link functions, and other crawling strategies that may skew the calculation of the importance of a webpage via link analysis algorithms.

SUMMARY

Described herein are implementations of various techniques for calculating a web page's importance using information from a web user's internet browsing behavior. In one implementation, a webpage importance application may receive information pertaining to the web browsing behavior data of one or more web users. Using the web browsing behavior data, the webpage importance application may reorganize the data into a browsing thread that may display a machine identification number from which the data may have been obtained from, a list of Universal Resource Locator (URL) addresses that the web user may have accessed from his machine, a time at which each URL address may have been accessed, and the manner in which the user accessed each URL address (e.g. via link or URL address entry).

After creating a browsing thread for each web user from which that data was obtained, the webpage importance application may create a graph to represent the web browsing behavior data. The webpage importance application may use the browsing thread to add nodes and lines to the graph to represent a web user's browsing behavior.

The webpage importance application may create a node (e.g., denoted by a circle) on a browsing graph for each URL address listed in each browsing thread. In one implementation, only one node may be created for each specific URL address. If a URL address was accessed after the user clicked a link from a different webpage, the webpage importance application may draw a line from the node which represents the URL address with the link to the node which represents the accessed URL address. The line may be represented by an arrow that may point to the destination URL address. The webpage importance application may then store the graph on a browsing graph file. In addition to the nodes and lines that may be created on the browsing graph, the webpage importance application may also store the time in which each URL address was accessed by each machine in the metadata portion of the browsing graph file.

The webpage importance application may then use the browsing graph file as an input for a webpage importance algorithm to calculate the importance of each URL address represented by a node in the browsing graph. The webpage importance algorithm may model the behavior of a web user by creating a continuous-time time-homogenous Markov process of the browsing graph. The importance of each node in the browsing graph may relate to a stationary probability distribution of each URL address listed in the continuous-time time-homogenous Markov process.

In order to speed up the calculation of the stationary probability distribution, the webpage importance algorithm may use an Embedded Markov Chain (EMC) to represent the continuous-time time-homogenous Markov process. The EMC may be a discrete-time Markov chain wherein the conditional probability of transitioning from one state (webpage) to another is represented therein. In this implementation, the EMC model may take into account the transition probability of a web browser clicking a link to another webpage or typing in a new URL address.

The webpage importance algorithm may then use the time data stored in the metadata of the browsing graph file to estimate a time in which each web page was being accessed. The webpage importance algorithm may first calculate each user's raw staying time on each webpage. The webpage importance algorithm may then remove certain noise factors from the raw staying time data to account for a user's behavior that may not accurately reflect time in which a webpage was being accessed such as when the user may receive a phone call, the load time of the webpage is slow, and other similar delays that may result in an inaccurate representation of the time in which a web user may have been accessing the webpage.

After estimating the time in which each web page was being accessed for each user defined in the browsing graph, the webpage importance algorithm may combine the EMC model and the estimated time for each webpage to calculate the stationary probability distribution of each node in the browsing graph. The stationary probability distribution value of each node may correlate to the importance the respective node's webpage.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In general, one or more implementations described herein are directed to calculating webpage importance based on the behavior of one or more web users. One or more implementations of various techniques for calculating webpage importance will now be described in more detail with reference to FIGS. 1-4 in the following paragraphs.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
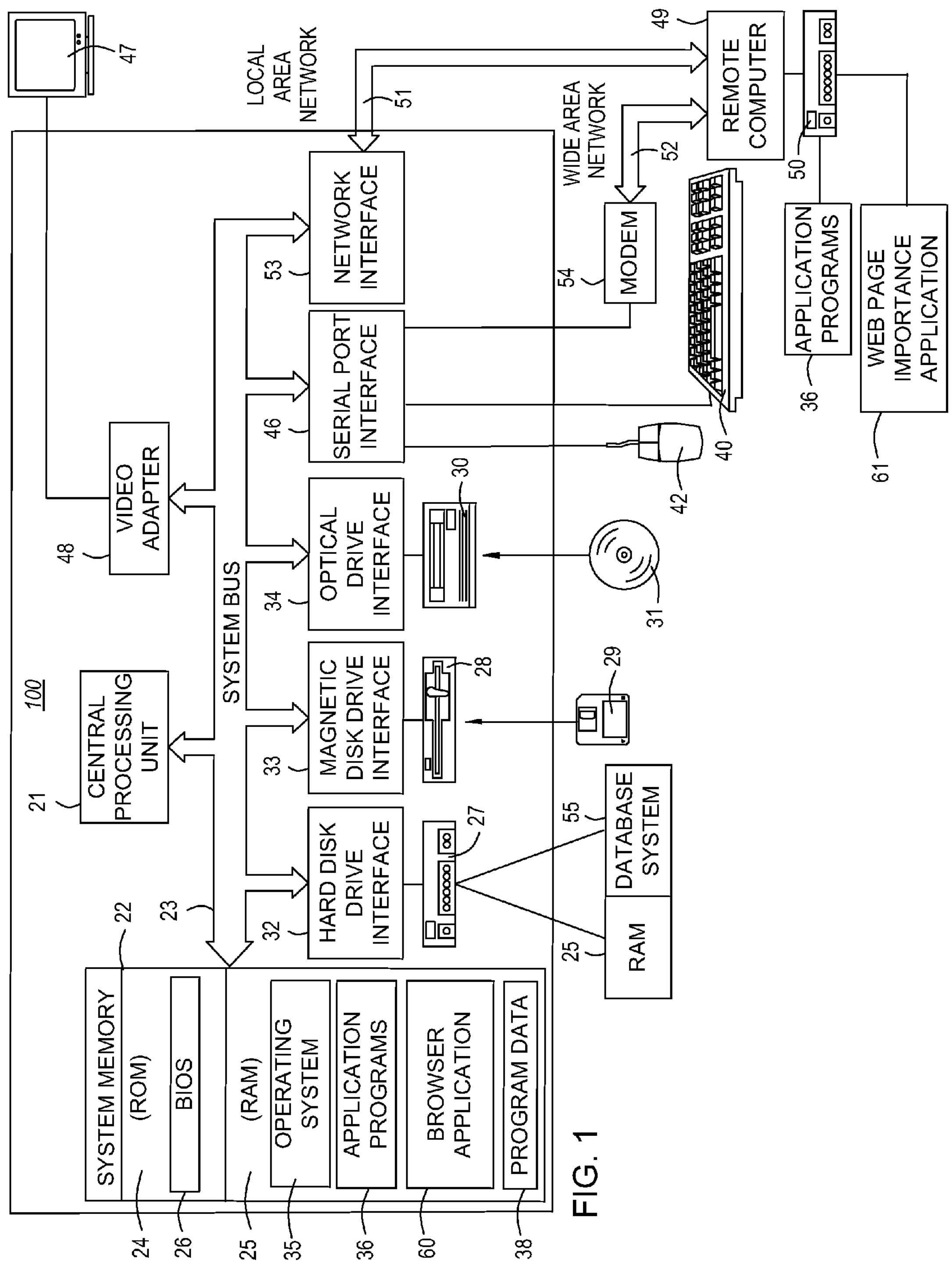
FIG. 1 illustrates a schematic diagram of a computing system in which the various techniques described herein may be incorporated and practiced.

FIG. 1 illustrates a schematic diagram of a computing system 100 in which the various technologies described herein may be incorporated and practiced. Although the computing system 100 may be a conventional desktop or a server computer, as described above, other computer system configurations may be used.

The computing system 100 may include a central processing unit (CPU) 21, a system memory 22 and a system bus 23 that couples various system components including the system memory 22 to the CPU 21. Although only one CPU is illustrated in FIG. 1, it should be understood that in some implementations the computing system 100 may include more than one CPU. The system bus 23 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24.

The computing system 100 may further include a hard disk drive 27 for reading from and writing to a hard disk, a magnetic disk drive 28 for reading from and writing to a removable magnetic disk 29, and an optical disk drive 30 for reading from and writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100.

Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 27, magnetic disk 29, optical disk 31, ROM 24 or RAM 25, including an operating system 35, one or more application programs 36, a browser application 60, program data 38, and a database system 55. The operating system 35 may be any suitable operating system that may control the operation of a networked personal or server computer, such as Windows® XP, Mac OS® X, Unix-variants (e.g., Linux® and BSD®), and the like. The browser application 60 may be a web browsing software that may be capable of recording the browsing activity of its user. The browser application 60 will be described in more detail with reference to FIG. 2 in the paragraphs below.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices such as speakers and printers.

Further, the computing system 100 may operate in a networked environment using logical connections to one or more remote computers The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54, wireless router or other means for establishing communication over a wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. The remote memory storage device 50 may include a webpage importance application 61. In one implementation, the webpage importance application 61 may be stored on the hard disk 27, magnetic disk 29, optical disk 31, ROM 24, or RAM 25. The webpage importance application 61 will be described in more detail with reference to FIGS. 2-4 below. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 2:
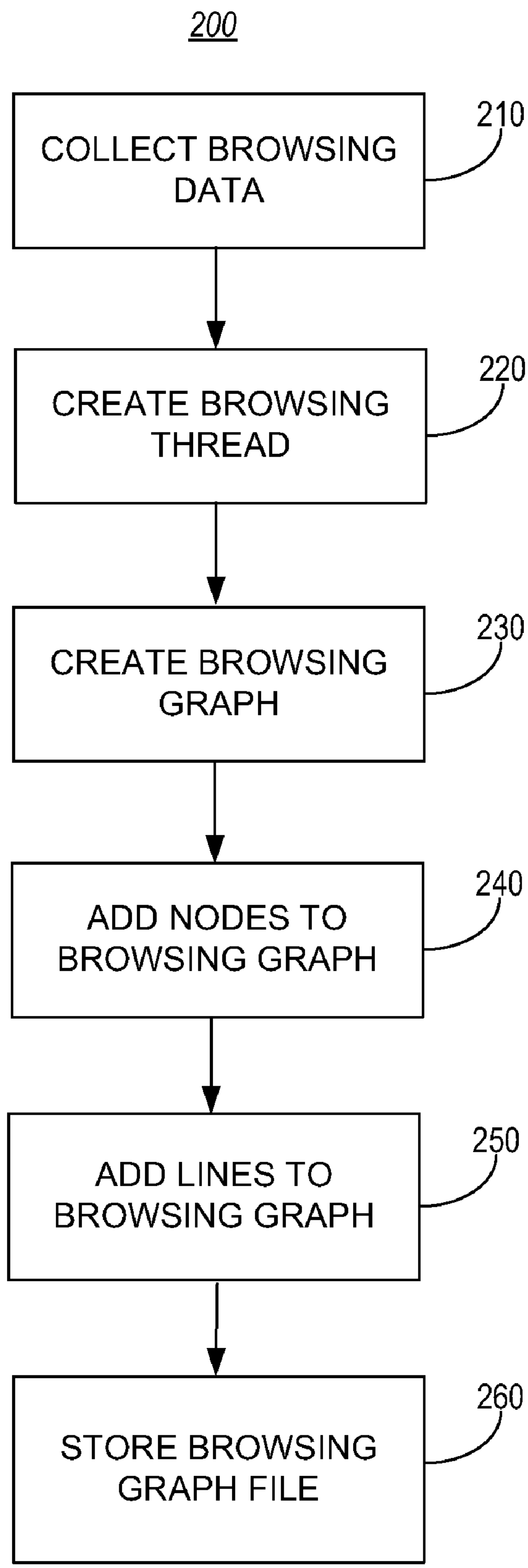
FIG. 2 illustrates a flow diagram of a method for creating a browsing graph in accordance with one or more implementations of various techniques described herein.

FIG. 2 illustrates a flow diagram 200 for creating a browsing graph in accordance with one or more implementations of various techniques described herein. The following description of flow diagram 200 is made with reference to computing system 100 of FIG. 1 in accordance with one or more implementations of various techniques described herein. Additionally, it should be understood that while the operational flow diagram 200 indicates a particular order of execution of the operations, in some implementations, certain portions of the operations might be executed in a different order. In one implementation, the process for creating the browsing graph may be performed by the webpage importance application 61.

At step 210, the webpage importance application 61 may collect web browsing data from the browser application 60 of one or more web users. In one implementation, the browser application 60 may keep a record of the URL addresses (web pages) it may have accessed, the time at which each URL address may have been accessed, and the manner in which the URL address was accessed in a toolbar log. The URL address may have been accessed by a user from a hyperlink on a different webpage or it may have been accessed after a user entered the URL address into the URL address input of the browser application 60.

In one implementation, the webpage importance application 61 may receive a log or record of the web browsing data that occurred on the browser application 60 of one or more users. The webpage importance application 61 may obtain a log from multiple web users in order to create a comprehensive and accurate browsing graph. Prior to receiving the web browsing data from one or more web users, the webpage importance application 61 may receive permission to receive the data from each user of the browser application 60 via legal agreements or the like. In one implementation, the identity of each user may remain anonymous when obtaining the log of the web browsing data from any web user.

At step 220, the webpage importance application 61 may create a browsing thread from the user browsing behavior data obtained from the one or more browser applications 60. In one implementation, the web browsing data of each individual browser application 60 may be separated into different browsing threads. The browsing thread may include a machine identification number to indicate where the web browsing data may have been obtained from, the URL addresses accessed by the browser application 60, the time at which each URL address was accessed, and the means in which each URL address was accessed. In one implementation, a browsing thread may be created for each machine identification number.

At step 230, the webpage importance application 61 may create a browsing graph. In one implementation, the browsing graph may initially contain a blank page.

At step 240, the webpage importance application 61 may add a node for each URL address listed in each browsing thread created at step 220. A node may be represented on the browsing graph as a circle. In one implementation, if two or more identical URL addresses appear in one or more browsing threads, the identical URL addresses may be represented by only one node in the browsing graph. If a URL address appears multiple times on one or more browsing threads, the webpage importance application 61 may indicate the amount of times in which the URL address may have been accessed by coloring the node that represents the URL address darker or storing that information in the metadata of the browsing graph file. The browsing graph file may store the browsing graph and some other relevant information in its metadata.

At step 250, the webpage importance application 61 may add a line or link from a node representing a first accessed URL address to a node representing a second accessed URL address if the browsing thread indicates that the web user accessed the second URL address via a hyperlink from the webpage displayed on the first URL address. In one implementation, the line may be represented by an arrow that may point from the node representing a first accessed URL address to the node representing a second accessed URL address. In one implementation, if one link was used multiple times to access a particular URL address, it may be represented by only one arrow in the browsing graph. In this case, the webpage importance application 61 may indicate the amount of times in which the URL address may have been accessed by coloring the arrow that connects to the URL address darker or storing that information in the metadata of the browsing graph file.

At step 260, the webpage importance application 61 may store the browsing graph and information pertaining to the time at which each URL address was accessed in a browsing graph file. In one implementation, the time information may be stored in the metadata of the browsing graph file.

Figure 3:
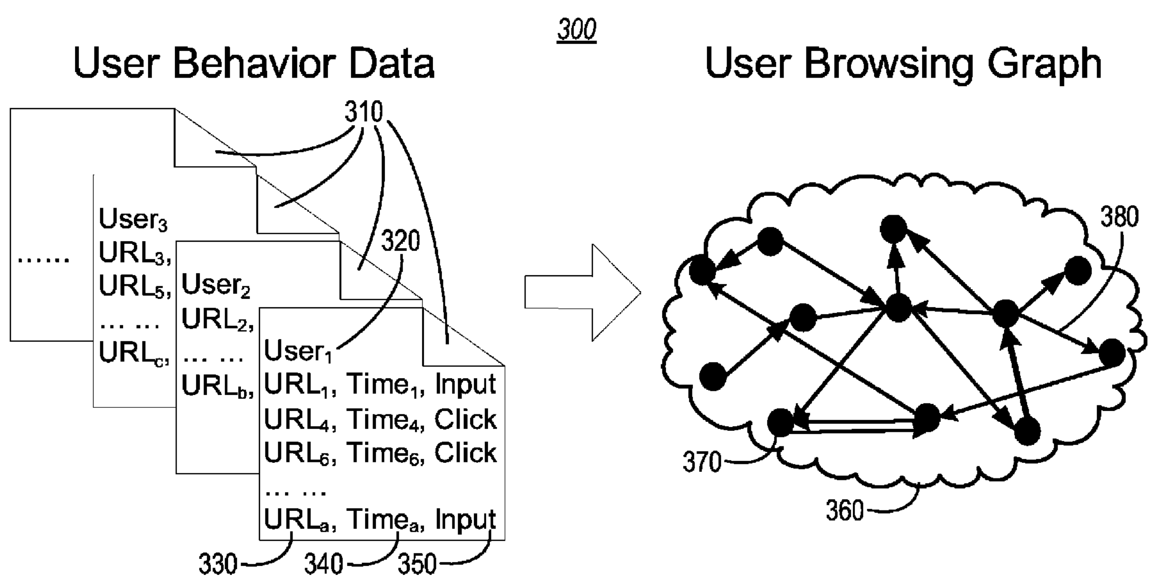
FIG. 3 illustrates a schematic diagram of a browsing thread and a browsing graph in accordance with one or more implementations of various techniques described herein.

FIG. 3 illustrates a schematic diagram 300 of a browsing thread 310 and a browsing graph 360 in accordance with one or more implementations of various techniques described herein. In one implementation, the webpage importance application 61 may create the user browsing thread 310 for each user from which the application received information.

Each user browsing thread 310 may include information pertaining to a user's web browsing behavior. In one implementation, the user may use the browser application 60 to access various URL addresses on the Internet. The information stored in the user browsing thread 310 may include the machine identification 320, the URL address 330, the URL access time 340, and the URL access method 350. In one implementation, the browsing thread 310 may list the URL addresses 330 in chronological order according to their respective URL access times 340. The machine identification 320 may be assigned a random number to keep the actual identity of each user anonymous.

The URL address 330 may indicate a URL address that the web user may have navigated to on the Internet. The URL access time stamp 340 may indicate the time at which the URL address 330 was initially accessed or the time in which the URL address 330 was completely loaded on the browser application 60. The URL access method 350 may include either "input" or "click." "Input" may refer to a user navigating to a URL address by entering the URL address 330 into the browser application 60. "Click" may refer to a user clicking a hyperlink from a webpage that may connect to the URL address 330.

The browsing thread 310 may be used by the webpage importance application 61 to create the browsing graph 360 as illustrated in the steps of the method 200. In one implementation, the browsing graph 360 may include one or more nodes 370 and one or more arrows 380. Each node 370 may represent each URL address 330 that may be listed in the browsing thread 310. Each arrow 380 may represent a hyperlink that existed on one webpage connected to another webpage. The head of the arrow 380 may be directed at the node 370 and represent the destination of the hyperlink. The tail of the arrow 380 may be connected to the node 370 and may represent the webpage that contained the hyperlink.

In one implementation, the webpage importance application 61 may incorporate all of the information obtained from each user's browsing thread 310 on a single browsing graph 360. Since the browsing graph 360 may include information pertaining to the web browsing behavior of all of the users it may have received the browsing thread 310 from, it may more accurately model a random user's web browsing behavior. The random user's web browsing behavior model, or the browsing graph 360, may then be used to calculate the importance of each webpage listed in the browsing graph 360. The browsing graph 360 may be capable of storing billions of web user's browsing behavior patterns, and these patterns may be interpreted as an implicit voting on webpage importance by each of the web users.

Figure 4:
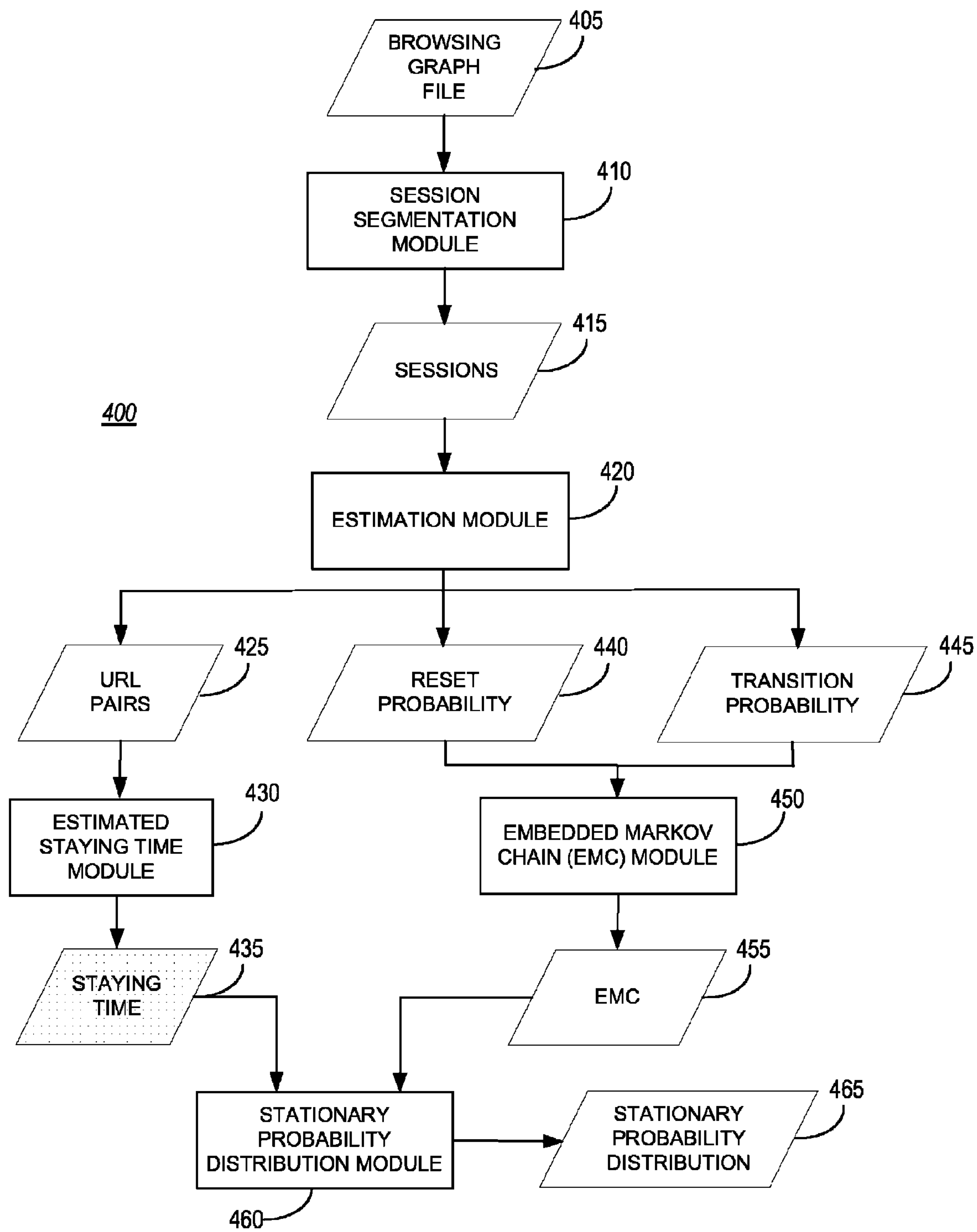
FIG. 4 illustrates a data flow diagram of an algorithm for calculating webpage importance in accordance with one or more implementations of various techniques described herein.

FIG. 4 illustrates a data flow diagram 400 for an algorithm that may be used to calculate webpage importance in accordance with one or more implementations of various techniques described herein. The following description of flow diagram 400 is made with reference to computing system 100 of FIG. 1 in accordance with one or more implementations of various techniques described herein.

In one implementation, the webpage importance application 61 may split a user's web browsing activities into one or more sessions such that each session may represent a user's browsing activities during a single sitting. In order to group a user's web browsing activities into one or more sessions, the browsing graph file 405 may be used as an input into the session segmentation module 410. The session segmentation module 410 may segment a user's browsing behavior into browsing sessions 415. In one implementation, if the difference between the time stamps 340 of two linked URL addresses is more than a specified amount of time, the session segmentation module 410 may create a new session 415. This kind of session segmentation may be referred to as a "time rule." In another implementation, the session segmentation module 410 may also create a new session 415 if the web user entered a new URL address into the browser application 60. This kind of session segmentation may be referred to as a "type rule." Although the session segmentation module 410 has been described as creating sessions 415 based on the time or type rule, it should be noted that sessions 415 may also be created using a variety of other methods.

The sessions 415 may be provided as an input into an estimation module 420. The estimation module 420 may output the URL pairs 425, the reset probability 440, and the transition probability 445 of each session 415. In one implementation, the URL pairs 425 may be created by putting together URL addresses that may be linked together by the arrow 380 in between two nodes 370 of the browsing graph 360.

The reset probability 440 may correspond to each session 415 that may have been segmented due to the type rule. In one implementation, a URL address obtained by the type rule may be referred to as "green traffic." The estimation module 420 may regard URL addresses created by green traffic as the destinations of a random reset (when web users do not want to use a hyperlink on a webpage). The estimation module 420 may normalize the frequencies of the URL addresses being the first one in a session to get the reset probability 440 of the URL address.

The transition probability 445 may be determined by the estimation module 420 by analyzing the transitions of the web user on the browsing graph 360 via arrows 380. Each arrow 380 on the browsing graph 360 represents the transition between two URL addresses and the number of transitions between two nodes may be used as a weight factor in determining the transition probability 445.

The URL pairs 425 may be used as an input into the estimated staying time module 430 to find a raw staying time for each URL address. The raw staying time may refer to the time in which a URL address was being accessed. For example, a user may navigate to a first URL address and remain on that URL address for a certain length of time before navigating to a second URL address. The actual time that expired between when the second URL address was accessed and when the first URL address was accessed may be referred to as the raw staying time. The estimated staying time module 430 may calculate the raw staying time for each URL address by determining the difference between the times at which each URL address of the URL pair 425 were accessed. In one implementation, the estimated staying time module 430 may estimate the raw staying time for a last URL address listed in a session by taking a random time sample from a distribution of times in which the URL address was being accessed in its records as the raw staying time. If the session is segmented by the type rule, the estimated staying time module 430 may use the difference between the time of the last URL address in the session and that of the first URL of the next session as the raw staying time.

After determining the raw staying time of each URL address, the estimated staying time module 430 may remove noise that may be contained within the raw staying times. Noise considerations may be due to Internet connection speed, page size, page structure, and other factors. In order to remove the noise from the raw staying time, the estimated staying time module 430 may create an additive noise model to represent the observations and to conduct an unbiased and consistent estimation each staying time $q_{ii}$. The staying time $q_{ii}$ may be a more accurate representation of the time in which a URL address was being accessed because certain noise components may have been removed.

In one implementation, suppose for page, the estimated staying time module 430 may have $m_i$ observations on the time in which a webpage was being accessed in the browsing graph file 405, denoted as $Z_1, Z_2, \ldots, Z_{m_i}$, and they have the same distribution as random variable Z. Without loss of generality, the estimated staying time module 430 may assume that Z is the combination of real time in which a web page was being accessed $T_i$ and noise U, i.e., $$Z=U+T_i \quad (1)$$

If noise U is governed by a Chi-square distribution as Chi(k), then its mean and variance will be k and 2k respectively. Furthermore, the mean and variance of Z may be $\mu$ and $\sigma^2$. By assuming U and $T_i$ to be independent, the estimated staying time module 430 may have:

$$\mu \triangleq E(Z) = E(U + T_i) = k - \frac{1}{q_{ii}} \quad (2)$$

$$\sigma^2 \triangleq \mathrm{Var}(Z) = \mathrm{Var}(U + T_i) = 2k + \frac{1}{q_{ii}^2} \quad (3)$$

The sample mean $$\overline{Z} = \frac{1}{m_i}\sum_{l=1}^{m_i} Z_l$$

and sample variances $$S^2 = \frac{1}{m_i - 1}\sum_{l=1}^{m_i}(Z_l - \overline{Z})^2$$

may be unbiased and consistent estimators for $\mu$ and $\sigma^2$. The estimation time module 430 may then estimate $q_{ii}$ by solving the following optimization problem:

$$\min_{q_{ii}}\left(\left(\overline{Z} + \frac{1}{q_{ii}}\right) - \frac{1}{2}\left(S^2 - \frac{1}{q_{ii}^2}\right)\right)^2 \quad (4)$$
$$\text{s.t. } q_{ii} < 0$$

The mean and variance of the random variable Z are $\mu$ and $\sigma^2$, and the mean and variance of Z from the samples are Z-bar ($\overline{Z}$) and $S^2$. In order to estimate the staying time $q_{ii}$, equation (2) and equation (3) may be optimized in equation (4). Equation (2) may be converted such that $k_1$=Z-bar ($\overline{Z}$)+1/$q_{ii}$, and equation (3) may be converted such that $k_2$=(½)*($S^2$−1/$q_{ii}^2$). In estimating the staying time $q_{ii}$, the difference between $k_1$ and $k_2$ may be as small as possible. Therefore, optimizing equation (4) may estimate the staying time $q_{ii}$. The output of the estimated staying time module 430 may be the staying time 435. The staying time 435 may represent the time in which each URL address was being accessed without noise factors. The staying time 435 may then be used as an input into the stationary probability distribution module 460.

In one implementation, the browsing graph file 405 may be represented as a continuous-time time-homogenous Markov process. However, in order to compute a stationary probability distribution for this continuous-time time-homogenous Markov process, the EMC module 450 may find the embedded Markov chain (EMC 455) of this continuous-time time-homogenous Markov process.

Referring back to the outputs of the estimation module 420, the reset probability 440 and the transition probability 445 may be used as inputs into an Embedded Markov Chain (EMC) module 450. The EMC module 450 may create a transition rate matrix to represent the conditional probability of transitioning from one webpage to another. The EMC module 450 may use the reset probability 440 and the transition probability 445 to create a discrete-time Markov process featured by a transition probability matrix with zero values in all its diagonal positions and $$-\frac{q_{ij}}{q_{ii}}$$

in the off-diagonal positions.

The EMC module 450 may define the browsing graph 405 as G=⟨V,W,T,σ⟩, where V={$v_i$}, W={$w_{ij}$}, T={$T_i$}, σ={$\sigma_i$}, (i,j=1, . . . , N) denote nodes 370, weights of arrows 380, lengths of time in which a webpage was being accessed, and reset probabilities, respectively. N denotes the number of web pages in the user browsing graph. V may represent a set of nodes in which each node may represent a web page. W may represent a set of arrows, and the weights of each arrow may be set according to the frequency of the arrows between the nodes. $T_i$ may represent a set of time samples that represent the length of time that a user was accessing a web page. Sigma (σ) may represent a vector of reset probability or the normalized frequency of a user accessing a web page by typing the URL address directly into the browser application 60.

The EMC module 450 may then add a pseudo-node (the (N+1)$^{th}$ node) to G, and add two types of arrows: an arrow from the last URL address in each session to the pseudo-node, with the transition probability 445 as its weight; and an arrow from the pseudo-node to the first URL address in each session, with the reset probability 440 as its weight. The EMC module 450 may denote the new graph as $\tilde{G}$=⟨$\tilde{V}$,$\tilde{W}$,T,$\tilde{\sigma}$⟩, where |$\tilde{V}$|=N+1, $\tilde{\sigma}$=⟨$\sigma_1$, . . . , $\sigma_N$,0⟩. V-wave ($\tilde{V}$) may represent the union set of node set V and the additional pseudo-nodes. W-wave ($\tilde{W}$) is the union set of arrow set W and the arrows with weights between the nodes in V and the additional pseudo-nodes. Sigma-wave ($\tilde{\sigma}$) may represent the union vector of sigma and 0, i.e., $\tilde{\sigma}$=⟨$\sigma_1$ . . . , $\sigma_N$,0⟩. Based on a large number of web users, the transition probabilities and reset probabilities in the EMC may be estimated in the equation below, $$-\frac{q_{ij}}{q_{ii}} = \begin{cases} \alpha\dfrac{\tilde{w}_{ij}}{\sum_{k=1}^{N+1}\tilde{w}_{ik}} + (1-\alpha)\sigma_j, & i \in V,\ j \in \tilde{V} \\ \sigma_j, & i = N+1,\ j \in V \end{cases} \quad (5)$$

The result of the equation may be used to determine the EMC 455, and it may describe a web user's random walk on the browsing graph 360. The web user may go along the edges with the probability α, or he may choose to restart from a new page with the probability $(1-\alpha)$. The selection of the new page is determined by the reset probability 440.

In one implementation, the advantage of using the EMC 455 for estimation may be that the estimation will not be biased by the limited number of observed transitions. Another advantage may be that the corresponding EMC 455 is primitive, and thus has a unique stationary distribution which may be used to calculate the stationary distribution of each node 370 in an efficient manner such as the power method and the like.

The staying time 435 and the EMC 455 may then be used as inputs into the stationary probability distribution module 460 to determine the webpage importance 465. The web page importance 465 may correspond to the stationary probability distribution of each node 370 on the browsing graph 360. The stationary probability distribution module 460 may define a transition rate matrix as the derivation of the transition probability 445 defined as P(t) when t goes to 0, if it exists (e.g., $Q \overline{\Delta} P'(0)$). In one implementation, the matrix $Q=(q_{ij})_{N\times N}$ may be referred to as the Q-matrix for short. It has been proven that when the state space is finite there is a one-to-one correspondence between the Q-matrix and P(t), and $-\infty<q_{ii}<0$; $\Sigma_j q_{ij}=0$. The matrix $Q=\{q_{ij}\}$ is often called Q-matrix for short, and the continuous-time Markov process may be characterized as a Q-Process in probability theory. Due to the correspondence between the Q-matrix and P(t) correspondence, the stationary probability distribution module 460 may use the Q-Process to represent the browsing graph file 405 as a continuous-time Markov process. In one implementation, if X is a Q-process, and Y is the Embedded Markov Chain (EMC) derived from its transition probability 445 and reset probability 440, $\pi=(\pi_1, \ldots, \pi_N)$ and $\tilde{\pi}=(\tilde{\pi}_N)$ may denote the stationary probability distributions of X and Y such that $$\pi_i = \frac{\tilde{\pi}_i / q_{ii}}{\sum_{j=1}^{N} \tilde{\pi}_j / q_{jj}} \tag{6}$$

The stationary probability distribution $\pi$ may be independent of t and associated with $P(t)=[p_{ij}(t)]_{N\times N}$, such that $\forall$ t>0, and $$\pi=\pi P(t) \tag{7}$$

The $i^{th}$ entry of the distribution $\pi$ stands for the ratio of the time the web user spends on the $i^{th}$ page over the time she spends on all the pages when time interval t goes to infinity. In this regard, this distribution $\pi$ can be a measure of the webpage importance 465.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining a webpage importance of an individual webpage, the method comprising:

receiving web browsing behavior data of one or more users;

creating a model of the web browsing behavior data, the creating comprising:

estimating staying times for webpages when the webpages are accessed by the one or more users, the webpages including the individual webpage;

calculating reset probabilities in which the one or more users navigated among the webpages by entering Uniform Resource Locator (URL) addresses into web browsers;

determining transition probabilities in which the one or more users navigated among the webpages by clicking hyperlinks;

using the reset probabilities and the transition probabilities to create a discrete-time embedded Markov chain model; and using the estimated staying times and the discrete-time embedded Markov chain model to create the model of the web browsing behavior data;

calculating a stationary probability distribution of the model of the web browsing behavior data; and correlating the stationary probability distribution to the webpage importance of the individual webpage, wherein estimating the staying times comprises:

determining differences in time between individual accesses of the web pages by the one or more users; and removing noise from the differences in time; and wherein at least the creating the model of the web browsing behavior data is performed with a computing device.

2. The method of claim 1, wherein the web browsing behavior data identifies the web pages accessed by the one or more users, times at which the one or more users accessed each of the web pages, and a method in which each of the web pages is accessed.

3. The method of claim 1, further comprising:

creating a browsing graph representing the web pages accessed by the one or more users and a method in which each of the web pages is accessed.

4. The method of claim 3, wherein the browsing graph is created by:

organizing the web browsing behavior data into a browsing thread;

adding a node on the browsing graph for each of the web pages that is listed on the browsing thread; and adding a line connecting two or more nodes on the browsing graph, wherein the line represents a hyperlink.

5. The method of claim 4, wherein the browsing thread separates the web browsing behavior data for each of the one or more users.

6. The method of claim 1, wherein the model of the web browsing behavior comprises a continuous-time time-homogeneous Markov process model.

7. The method of claim 1, wherein removing the noise comprises:

solving an optimization problem according to $$\min_{q_{ii}} \left( \left( \overline{Z} + \frac{1}{q_{ii}} \right) - \frac{1}{2} \left( S^2 - \frac{1}{q_{ii}^2} \right) \right)^2,$$

$$\text{s.t. } q_{ii} < 0$$

wherein a mean and variance from samples of a random variable Z are Z-bar ($\overline{Z}$) and $S^2$ and the time in which an individual URL address was being accessed is $q_{ii}$.

8. The method of claim 1, further comprising:

segmenting an individual user's activities into one or more sessions; and calculating the estimated staying time, the reset probability and the transition probability using the sessions.

9. The method of claim 8, wherein segmenting the individual user's activities into sessions comprises:

determining whether an individual URL address was entered into an individual web browser; and creating a new session if the individual URL address was entered.

10. A memory storage device having stored thereon computer-executable instructions which, when executed by the computing device, cause the computing device to perform the method of claim 1.

11. A method for determining a webpage importance of an individual webpage, the method comprising:

receiving web browsing behavior data of one or more users that browse web pages including the individual webpage;

segmenting activities of the web users into one or more sessions, the segmenting comprising:

determining differences in times at which different webpages are accessed;

comparing the differences in the times to a predetermined value; and creating new sessions if the differences in the times are greater than the predetermined value;

creating a model of the web browsing behavior data, the creating comprising:

estimating staying times for the webpages when the webpages are accessed by the one or more users, the webpages including the individual webpage;

calculating reset probabilities based on the one or more users navigating among the webpages by entering Uniform Resource Locator (URL) addresses into web browsers;

determining transition probabilities based on the one or more users navigating among the webpages by clicking hyperlinks; and using the estimated staying times, the reset probabilities, and the transition probabilities to create the model of the web browsing behavior data;

calculating a stationary probability distribution of the model of the web browsing behavior data; and correlating the stationary probability distribution to the webpage importance of the individual webpage, wherein at least the creating the model of the web browsing behavior data is performed with a computing device.

12. The method of claim 11, wherein using the estimated staying times, the reset probabilities, and the transition probabilities to create the model of the web browsing behavior data comprises using at least one of the reset probabilities or the transition probabilities to create a Markov chain model and using the Markov chain model to create the model of the web browsing behavior data.

13. The method of claim 11, wherein the web browsing behavior data is represented as a graph.

14. The method of claim 13, wherein the graph comprises nodes representing addresses of the web pages.

15. A memory storage device having stored thereon computer-executable instructions which, when executed by the computing device, cause the computing device to perform the method of claim 11.

16. A method for determining a webpage importance of an individual webpage, the method comprising:

receiving web browsing behavior data of one or more users that browse web pages including the individual webpage;

modeling the web browsing behavior data, the modeling comprising:

estimating staying times for the webpages when the webpages are accessed by the one or more users, the webpages including the individual webpage; and at least one of:

calculating reset probabilities based on the one or more users navigating among the webpages by entering Uniform Resource Locator (URL) addresses into web browsers; or determining transition probabilities based on the one or more users navigating among the webpages by clicking hyperlinks;

determining a probability distribution of the model of the web browsing behavior data based on the estimated staying times and at least one of the reset probabilities or the transition probabilities; and using the probability distribution to determine the webpage importance of the individual webpage, wherein estimating the staying times comprises pairing two URL addresses when the two URL addresses were accessed in sequence, and wherein at least the modeling is performed with a computing device.

17. The method of claim 16, wherein the modeling comprises both calculating the reset probabilities and determining the transition probabilities.

18. The method of claim 17, wherein the probability distribution is determined using both the reset probabilities and the transition probabilities.

19. The method of claim 16, wherein estimating the staying times comprises removing noise from raw staying time data.

20. A memory storage device having stored thereon computer-executable instructions which, when executed by the computing device, cause the computing device to perform the method of claim 16.

* * * * *